United States Patent [19]

Woods et al.

[11] 4,405,964
[45] Sep. 20, 1983

[54] OVER VOLTAGE CIRCUIT FOR A SWITCHING REGULATOR POWER SUPPLY

[75] Inventors: Jonathan L. Woods; Leroy A. Sutton, both of Wheeling, Ill.

[73] Assignee: Zenith Radio Corporation, Glenview, Ill.

[21] Appl. No.: 363,184

[22] Filed: Mar. 29, 1982

[51] Int. Cl.³ .................... H02H 3/20; H02H 7/122
[52] U.S. Cl. .................................... 361/18; 363/56
[58] Field of Search ................. 361/18, 91; 363/20, 363/21, 24, 25, 50, 55, 56, 57; 323/276, 300, 303

[56] References Cited

U.S. PATENT DOCUMENTS

| | | | |
|---|---|---|---|
| 3,522,482 | 8/1970 | Thompson | 361/18 X |
| 3,582,713 | 6/1971 | Till | 361/18 X |
| 3,733,519 | 5/1973 | Griffey | 361/18 X |
| 4,008,418 | 2/1977 | Murphy | 361/18 |
| 4,024,437 | 5/1977 | Suzuki | 361/18 X |
| 4,254,443 | 3/1981 | Wilson, Jr. | 361/18 X |

*Primary Examiner*—Harry E. Moose, Jr.
*Attorney, Agent, or Firm*—Jack Kail

[57] ABSTRACT

A protection circuit for a switching regulator power supply comprises a series-pass transistor having a collector-emitter circuit connected between a source of DC operating potential and the power supply. A bootstrap signal developed by the power supply and having a voltage level greater than the potential of the DC source is fed back to the base of the series-pass transistor for rendering the transistor fully conductive under normal operating conditions and to improve performance under marginally low levels of the DC source. A reverse biased diode is connected between the base of the series-pass transistor and the DC source to limit the transistor's base drive via the feedback path to a safe level. A shunting transistor is responsive to an overvoltage condition of the DC source for reducing the base drive of the series-pass transistor to limit the DC potential supplied to the power supply to a safe level.

11 Claims, 2 Drawing Figures

OVER VOLTAGE CIRCUIT FOR A SWITCHING
REGULATOR POWER SUPPLY

BACKGROUND OF THE INVENTION

The present invention relates generally to power supply protection circuits and, in particular, to an improved protection circuit for a switching regulator power supply.

Switching regulator power supplies are commonly used for developing a regulated output voltage for operating electronics equipment such as computers, video monitors and the like. Among other desirable features, these power supplies are extremely efficient in terms of power dissipation. In a typical switching regulator power supply, a DC voltage, developed by a battery for example, is coupled to an input of the power supply and converted to a regulated DC output voltage. Regulation is achieved by using a drive electronics circuit to monitor the output voltage level and to develop a pulse width modulated drive signal for controlling the conduction of one or more output transistors so as to adjust the output voltage in a direction to maintain a desired regulated voltage level. A double-ended output circuit may be used comprising a pair of push-pull operated high voltage output transistors responsive to the pulse width modulated drive signal, an output transformer and a rectification circuit. Alternatively, a single-ended output circuit comprising a single output transistor may be employed. In either case, the battery voltage is normally coupled to an input of the drive electronics circuit and also to a tap on the output transformer. The drive electronics circuit is especially susceptible to voltage spikes developed by the battery and must be protected therefrom in some manner. For example, it has recently been proposed to incorporate electronic apparatus such as computers and video monitors in automotive vehicles of the type normally having high capacity storage batteries which can develop signal spikes as high as 140 volts. Signal spikes of this magnitude can easily damage the power supply drive electronics circuit which normally comprises a number of relatively low level electronic devices.

Prior art protection circuits for switching regulator power supplies typically incorporate a zener diode connected to the base electrode of a transistor whose collector-emitter circuit is connected in series between the battery and the drive electronics circuit. The battery voltage is also coupled across the zener diode so that the voltage applied to the base of the series-pass transistor is limited by the zener diode to a selected safe level despite the presence of large signal spikes in the battery voltage.

Prior art protection circuits of the type described above exhibit a number of undesirable characteristics which are largely attributable to the use of the zener diode in the base circuit of the series-pass transistor. Initially, zener diodes are relatively expensive and are therefore not particularly well suited for use in mass-produced consumer articles. In addition, zener diodes are relatively unstable when exposed to wide temperature variations such as would be experienced in the environment of an automotive vehicle. Zener diodes also have a relatively slow response time wherein adequate protection for rapidly occurring signal spikes is not assured.

Another problem characterizing the prior art switching regulator protection circuits involves operation at marginally low battery voltage levels. In particular, due to the voltage drop across the collector-emitter circuit of the series-pass transistor, the voltage coupled to the drive electronics circuit of the switching regulator will always be less than the actual battery voltage. In the case of a marginally low battery voltage, the further voltage reduction introduced by the series-pass transistor may result in a voltage being coupled to the drive electronics circuit which is too low to effect operation thereof.

OBJECTS OF THE INVENTION

It is therefore a basic object of the present invention to provide an improved protection circuit for a switching regulator power supply.

It is a more specific object of the invention to provide a protection circuit for a switching regulator power supply which is inexpensive to manufacture, exhibits a high degree of stability over wide temperature variations and which is extremely fast to respond to signal spikes in the battery voltage.

It is a further object of the invention to provide a protection circuit for a switching regulator power supply in which a minimal voltage drop is experienced across a series-pass element connected between the battery and the power supply to improve the likelihood of power supply operation at marginally low battery voltage levels.

BRIEF DESCRIPTION OF THE DRAWINGS

The features of this invention which are believed to be novel are set forth with particularity in the appended claims. The invention together with its objects and the advantages thereof, may be best understood by reference to the following description taken in conjunction with the accompanying drawings, in which like reference numerals identify like elements in the several figures and in which:

DESCRIPTION OF THE PREFERRED
EMBODIMENT

Figure 1:
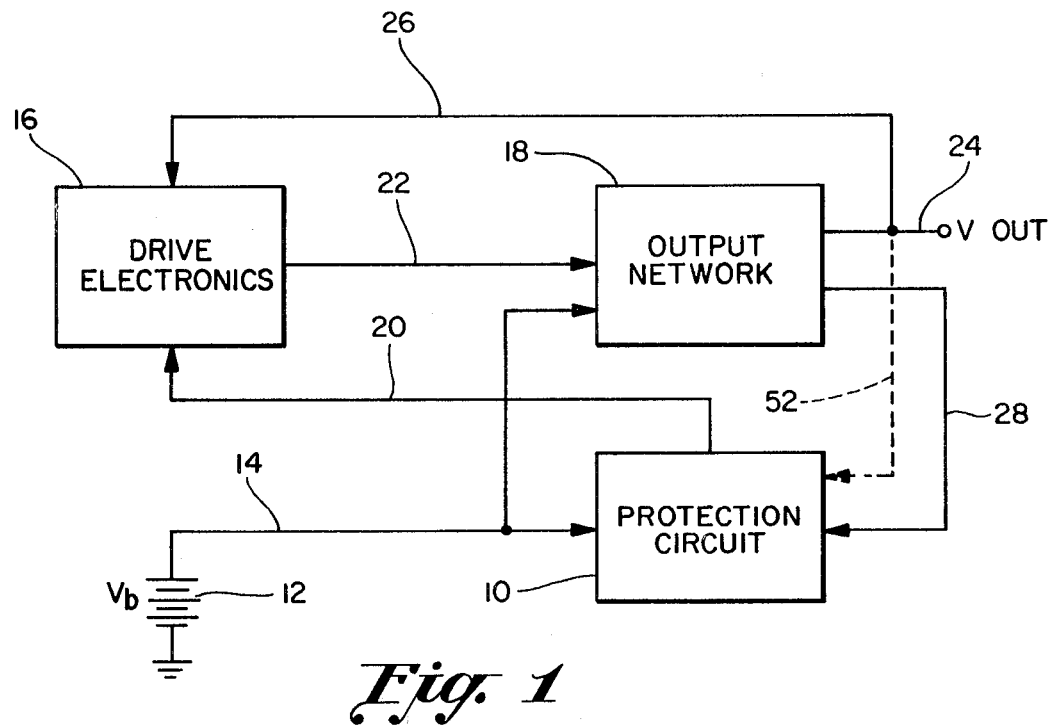
FIG. 1 is a block diagram illustrating a switching regulator power supply and a protection circuit connected thereto according to the invention.

Referring to FIG. 1, there is shown in block diagram form a switching regulator power supply and a protection circuit 10 connected thereto according to the present invention. The power supply comprises a storage battery 12 supplying a nominal DC voltage on a conductor 14, a drive electronics circuit 16 and an output network 18. It should be appreciated that the particular arrangement of the power supply shown in FIG. 1 is exemplary only and therefore should not be taken to impose any unnecessary limitations on the present invention.

Returning to FIG. 1, the DC voltage developed by storage battery 12 is supplied by conductor 14 to an input of protection circuit 10 and also to a first input of output network 18. Protection circuit 10 supplies a protected representation of the battery voltage to drive electronics circuit 16 over a conductor 20, drive electronics circuit 16, in turn, coupling a drive signal to output network 18 over one or more drive lines 22. A regulated output voltage is developed at a first output 24 of output network 18, the output voltage being coupled in feedback relation to drive electronics circuit 16 over a feedback conductor 26. A bootstrap signal, to be explained in further detail hereinafter, is coupled from a second output of output network 18 to an input of protection circuit 10 over one or more conductors 28.

Drive electronics circuit 16 typically comprises a logic network embodied in the form of an integrated circuit and one or more low-level drive transistors. Output network 18 normally comprises one or more high voltage output transistors, an output transformer or coil and a rectification circuit. When a single drive transistor and a single output transistor are used, the power supply is commonly referred to as being single-ended whereas the power supply is commonly referred to as being double-ended when two drive transistors and two output transistors are utilized. In either case, i.e., single or double-ended configuration, the output voltage fed-back to the drive electronics circuit via conductor 26 is normally applied to the integrated logic network which, in combination with the drive transistors, develops one or more pulse width modulated drive signals for controlling the conduction of the output transistors. The output transistors are thereby switched on and off in accordance with the pulse width modulated drive signals to adjust the level of the output voltage in a direction to maintain a desired regulated output voltage level. In this regard, due to the nature of the output network, one or more pulse width modulated signals are normally developed by the output transformer whose voltage levels are substantially greater than the battery supply voltage; for example, twice the level of the battery voltage. It is this increased level or bootstrap signal which is applied from output network 18 to protection circuit 10 over conductor 28.

As described above, drive electronics circuit 16 includes an integrated circuit and one or more low-level drive transistors. These circuit elements are quite susceptible to voltage spikes developed by storage battery 12 and must be protected therefrom in some manner. These voltage spikes may, in certain environments such as in an automotive vehicle having a typical 12 volt storage battery, reach levels of up to 140 volts. In accordance with the present invention, protection circuit 10 is interposed between storage battery 12 and drive electronics circuit 16 to protect these low-level circuit elements from damage due to large voltage spikes and the like produced by the battery.

Figure 2:
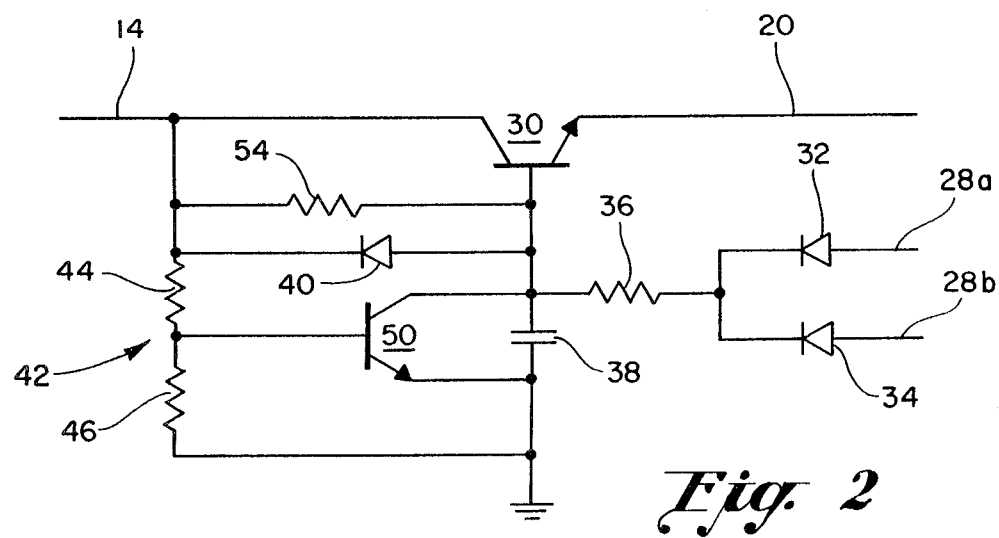
FIG. 2 is an electrical schematic diagram showing the protection circuit of FIG. 1.

FIG. 2 illustrates a preferred embodiment of protection circuit 10 in the case where the power supply is of the double-ended variety. The protection circuit includes a series-pass element in the form of an NPN transistor 30 having a collector-emitter circuit connected in series between battery 12 and drive electronics circuit 16. Each of the two increased level pulse width modulated bootstrap signals developed by output network 18 is applied through one of the conductors 28a or 28b to a respective rectifying diode 32 or 34. The rectified pulses are coupled to the base of transistor 30 by a filter circuit consisting of a resistor 36 and a capacitor 38 connected between rectifying diodes 32 and 34 and a point of reference or ground potential. The anode of a voltage limiting diode 40 is also connected to the base of transistor 30, the cathode of diode 40 being connected to conductor 14 which couples the battery to the collector of the transistor. In addition, an overvoltage sensing and shunting network 42 is connected between the base of transistor 30 and ground potential. Network 42 comprises a voltage divider consisting of resistors 44 and 46 connected between the collector of transistor 30 and ground potential, the common junction between resistors 44 and 46 being connected to the base of a NPN shunting transistor 50. The collector of transistor 50 is connected to the base of transistor 30 while the transistor's emitter is connected to ground potential.

During the start-up mode of operation, the bootstrap signal supplied to rectifying diodes 32 and 34 comprises a DC voltage substantially equal to the voltage $V_b$ of battery 12, which DC voltage is derived through the connection of battery 12 to output network 18. A DC signal about 1.0 volts less than $V_b$ is therefore coupled to the base of series-pass transistor 30 which begins to conduct thereby applying a DC voltage of about $V_b - 1.7$ volts from its emitter to drive electronics circuit 16. As a consequence, the power supply will begin operating wherein a sequence of pulse width modulated signals will be coupled through each of the drive lines 22 to output network 18 to drive the output voltage developed on conductor 24 toward a desired level. As this desired level is approached, the duty cycle of the pulse width modulated drive signals will decrease due to the operation of the output voltage sensing feedback circuit comprising feedback conductor 26 and drive electronics circuit 16.

Assuming subsequent normal operation of the power supply; i.e. the voltage of battery 12 is at its nominal level, the bootstrap signals supplied to conductors 28a and 28b by output network 18 will take the form of a sequence of pulse width modulated pulses having an amplitude about twice $V_b$. The bootstrap pulses are converted by rectifying diodes 32 and 34, resistor 36 and capacitor 38 to a high DC voltage at the base of series-pass transistor 30 to maintain the transistor in a saturated mode. In particular, assuming a voltage drop across the collector-emitter circuit of series-pass transistor of about 0.1-0.2 volts, the drive voltage at the base of transistor 30 will be about $V_b + 0.5$ volts, with diodes 32 and 34 each dropping about 0.7 volts and resistor 36 dropping about $V_b$ volts. The values of resistors 44 and 46 of overvoltage sensing network 42 are chosen so that transistor 50 is cut-off during normal operation whereby there is no shunting effect observed at the base of series-pass transistor 30. As a consequence, transistor 30 is maintained in a saturated mode for coupling the battery voltage $V_b$ (less the small collector-emitter voltage drop) to conductor 20 from where it is applied to drive electronics circuit 16 for operating the power supply.

In connection with the foregoing, it will be noticed that series-pass transistor 30 is operated such that only a small voltage drop is developed across its collector-emitter circuit. This is of particular significance in the case where a marginally low level operating voltage is developed by battery 12. In such a situation, the marginally low level battery voltage may be just barely sufficient to operate drive electronics circuit 16. If this marginally low level battery voltage were to be further reduced by the protection circuit an insufficient operating voltage would in all likelihood be coupled to drive electronics circuit 16. However, in accordance with the circuit configuration of FIG. 2, the voltage drop characterizing the protection circuit 10 between battery 12 and drive electronics circuit 16, i.e. across the collector-emitter circuit of transistor 30, is held to a minimum thereby maximizing the likelihood that a sufficiently high operating voltage will be applied to drive electronics circuit 16 under marginally low level conditions of battery 12.

Voltage limiting diode 40 serves to hold the voltage developed at the base of series-pass transistor 30 to a safe level (i.e. about $V_b+0.7$ volts) under normal operating conditions. This function of diode 40 is of particular importance in the situation where the battery voltage $V_b$ rises above the nominal level but not yet beyond the point where damage to drive electronics circuit 16 may result. In such cases of within normal range elevated battery voltages $V_v$, were it not for voltage limiting diode 40, it would be possible for the base drive voltage of series-pass transistor 30 to increase to a level wherein the voltage at the emitter of the transistor would be greater than the voltage at its collector thereby cutting-off the transistor. The reduced current levels needed to operate drive electronics circuit 16 (the increased battery voltage $V_b$ requiring a reduced current level to provide sufficient operating power) would then be totally derived from the bootstrap circuit. As a result, the voltage at the emitter of series-pass transistor could rise to a level nearly twice the battery voltage $V_b$ causing damage to drive electronics circuit 16. This is prevented by diode 40 which limits the voltage at the base of series-pass transistor 30 to about $V_b+0.7$ ensuring that the transistor remains on under normal conditions and also limiting the voltage at the emitter of the transistor to a safe level.

As the battery voltage $V_b$ rises above a safe level, as the result of a voltage spike or the like, transistor 50 is driven into conduction as a result of the voltage divider action of resistors 44 and 46. As a consequence, the base of transistor 30 is shunted to ground potential reducing the base drive of the transistor and causing it to conduct less heavily. The voltage dropped across the collector-emitter circuit of transistor 30 will thereby increase to maintain a safe voltage level on conductor 20 for protecting drive electronics circuit 16. If the battery voltage $V_b$ increases further, transistor 50 will conduct harder to further decrease the base drive and conduction of transistor 30 to insure protection of drive electronics circuit 16.

Protection circuit 10 thereby protects drive electronics circuit 16 from overvoltage conditions of battery voltage $V_b$ and additionally, under normal and marginally low levels of battery voltage V, exhibits a minimum voltage drop to provide an increased likelihood that a sufficient operating voltage level will be supplied to drive electronics circuit 16. Moreover, since the circuit incorporates transistors which may be rapidly switched from one state to another, fast response times to narrow voltage spikes are conveniently facilitated. Also, the stability of such transistors over wide temperature variations is quite good.

It was previously mentioned that the increased level of bootstrap signal coupled by diodes 32 and 34 to the base of transistor 30 must be greater than the battery voltage $V_b$ for proper circuit operation. To be more precise, the bootstrap voltage must be at least two diode drops (i.e. about 1.4 volts) greater than the supply voltage to insure that a proper base drive signal is developed at transistor 30. This is generally no problem since most commercial switching regulator power supplies develop an internal voltage well in excess of the battery voltage $V_b$.

The protection circuit 10 illustrated in FIG. 2 is, as previously mentioned, intended for use with a double-ended switching regulator power supply. A nearly identical circuit could also be used with a single-ended power supply, the only difference being that a single rectifying diode 32 or 34 would be required to couple the bootstrap voltage to the base of transistor 30.

In some cases, it might be desirable to derive the bootstrap voltage from the output 24 of output network 18, as indicated by dotted line 52, rather than from a point internal thereof. One advantage to be realized by this modification is that only a single rectifying diode for coupling the bootstrap voltage of the base of transistor 30 is required. However, since most switching regulator power supplies are AC coupled, provisions must be made for supplying a start-up voltage to drive electronics circuit 16 to initially enable the development of an output voltage at output 24. One convenient method for supplying the start-up voltage is to provide a resistor 54 between the battery 12 and the base of transistor 30. Resistor 54 will provide an initial start-up voltage to the base of transistor 30 allowing it to pass a voltage to drive electronics circuit 16 to enable start-up operation of the power supply.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A protection circuit for a switching regulator power supply operable in response to a source of DC potential $V_b$ for developing a bootstrap signal having a voltage level greater than $V_b$, said protection circuit comprising:
   - a series-pass transistor having a collector-emitter circuit connected between said source of DC potential and said power supply;
   - means for coupling said bootstrap signal to the base of said series-pass transistor;
   - a shunting transistor having a collector-emitter circuit connected between the base of said series-pass transistor and a point of reference potential; and
   - a voltage divider connected between said source of DC potential and said reference potential for coupling a control voltage to the base of said shunting transistor, said control voltage causing said shunting transistor to be non-conductive for values of $V_b$ less than a predetermined threshold value and to be conductive for values $V_b$ greater than said predetermined threshold value so as to reduce the base drive of said series-pass transistor for limiting the DC potential supplied to said power supply to a safe level.

2. A protection circuit according to claim 1 wherein the collector and emitter of said series-pass transistor are respectively coupled to said source of DC potential and said power supply and further including a diode connected between the base of said series-pass transistor and said source of DC potential for limiting said bootstrap signal at the base of said series-pass transistor to a safe level.

3. A protection circuit according to claim 2 wherein said bootstrap signal has a voltage level at least two diode voltage drops greater than $V_b$ and wherein said means for coupling comprises at least one rectifying diode and a filter circuit connected to the base of said series-pass transistor.

4. A protection circuit according to claim 2 wherein said bootstrap signal comprises a regulated output voltage of said power supply and including a power supply start-up resistor connected between said source of DC potential and the base of said series-pass transistor.

5. A protection circuit for a switching regulator power supply operable in response to a source of DC potential $V_b$ for developing a bootstrap signal having a voltage level greater than $V_b$, said protection circuit comprising:
- a series-pass transistor having a collector connected to said source of DC potential and an emitter connected to said power supply;
- means for coupling said bootstrap signal to the base of said series-pass transistor;
- diode means connected between the base of said series-pass transistor and said source of DC potential for limiting the voltage developed at the base of said series-pass transistor to a safe level;
- means for developing a control signal representative of the voltage of said source of DC potential $V_b$; and
- a shunting transistor operable in response to said control signal exceeding a predetermined threshold level for reducing the base drive of said series-pass transistor for limiting the DC potential supplied to said power supply to a safe level.

6. A protection circuit according to claim 5 wherein said control signal developing means comprises a voltage divider connected between said source of DC potential and a point of reference potential and wherein said shunting transistor includes a collector-emitter circuit connected between the base of said series-pass transistor and said point of reference potential.

7. A protection circuit according to claim 5 wherein said bootstrap signal has a voltage level at least two diode voltage drops greater than $V_b$ and wherein said means for coupling comprises at least one rectifying diode and a filter circuit connected to the base of said series-pass transistor.

8. A protection circuit according to claim 5 wherein said bootstrap signal comprises a regulated output voltage of said power supply and including a power supply start-up resistor connected between said source of DC potential and the base of said series-pass transistor.

9. A protection circuit for a switching regulator power supply operable in response to a source of DC potential $V_b$ for developing a bootstrap signal having a voltage level greater than $V_b$, said protection circuit comprising:
- a series-pass transistor having a collector connected to said source of DC potential and an emitter connected to said power supply;
- means for coupling said bootstrap signal to the base of said series-pass transistor;
- diode means connected between the base of said series-pass transistor and said source of DC potential for limiting the voltage developed at the base of said series-pass transistor to a safe level;
- a shunting transistor having a collector-emitter circuit connected between the base of said series-pass transistor and a point of reference potential; and
- a voltage divider connected between said source of DC potential and said reference potential for coupling a control voltage to the base of said shunting transistor, said control voltage causing said shunting transistor to be non-conductive for values of $V_b$ less than predetermined threshold value and to be conductive for values of $V_b$ greater than said predetermined threshold value so as to reduce the base drive of said series-pass transistor for limiting the DC potential supplied to said power supply to a safe level.

10. A protection circuit according to claim 9 wherein said bootstrap signal has a voltage level at least two diode voltage drops greater than $V_b$ and wherein said means for coupling comprises at least one rectifying diode and a filter circuit connected to the base of said series-pass transistor.

11. A protection circuit according to claim 9 wherein said bootstrap signal comprises a regulated output voltage of said power supply and including a power supply start-up resistor connected between said source of DC potential and the base of said series-pass transistor.

* * * * *